(12) United States Patent
Lo et al.

(10) Patent No.: US 6,185,607 B1
(45) Date of Patent: Feb. 6, 2001

(54) METHOD FOR MANAGING NETWORK DATA TRANSFERS WITH MINIMAL HOST PROCESSOR INVOLVEMENT

(75) Inventors: Burton B. Lo, San Francisco; Anthony L. Pan, Fremont; Pauline Cheng, Pleasanton, all of CA (US)

(73) Assignee: 3Com Corporation, Santa Clara, CA (US)

( * ) Notice: Under 35 U.S.C. 154(b), the term of this patent shall be extended for 0 days.

(21) Appl. No.: 09/085,395

(22) Filed: May 26, 1998

(51) Int. Cl.$^7$ .................................................. G06F 15/167

(52) U.S. Cl. ..................... 709/213; 709/202; 709/216; 709/217; 709/219; 710/22; 710/26; 710/27

(58) Field of Search .................... 709/200, 201, 709/202, 203, 204, 213, 214, 216, 217, 210, 253; 364/284; 710/22, 23, 24, 26, 27, 126, 254; 711/147

(56) References Cited

U.S. PATENT DOCUMENTS

| | | | | |
|---|---|---|---|---|
| 5,163,131 | * | 11/1992 | Row et al. ............................ | 395/200 |
| 5,249,279 | * | 9/1993 | Schmenk et al. ........................ | 710/5 |
| 5,615,382 | * | 3/1997 | Gavin et al. ............................ | 710/53 |
| 5,781,799 | * | 7/1998 | Legger et al. .......................... | 710/22 |
| 5,968,143 | * | 10/1999 | Chisholm et al. ..................... | 710/23 |
| 6,014,695 | * | 1/2000 | Yamashita et al. .................. | 709/219 |
| 6,065,083 | * | 5/2000 | Garcia et al. ......................... | 710/126 |

\* cited by examiner

*Primary Examiner*—Moustafa M. Meky
*Assistant Examiner*—Abdullahi Salad
(74) *Attorney, Agent, or Firm*—Wagner, Murabito & Hao LLP

(57) ABSTRACT

A method for managing data transfers with minimal host processor involvement. Data is transferred between a peripheral device coupled to a host computer and a network device over a high performance bus. In one exemplary embodiment, data is transferred over a bus utilizing the IEEE 1394 communication protocol and a network utilizing the Ethernet communication protocol. The novel data transfer method advantageously minimizes the involvement of the host computer's processor in the management of data transfers, thus maximizing the host processor's availability for performing other computations. Specifically, to transfer data from the peripheral device to the network, the host processor generates a data pointer table and sends it to the network device. A processor in the network device then takes over data transfer management, using information in the data pointer table to locate and transmit the designated block of data from the peripheral device to the network. In another embodiment, the present invention determines whether the size of a data block to be transferred exceeds the maximum packet size for the relevant communication protocol used by the bus or the network. If such a limit exists and is exceeded, the data pending transfer is divided into multiple packets, such that each packet conforms to the maximum packet size of the limiting protocol. Then, the smaller packets are transmitted iteratively until the entire data block is transferred. As such, the present invention eliminates the incompatibility problem posed by the differences in packet sizes among different communication protocols.

28 Claims, 10 Drawing Sheets

METHOD FOR MANAGING NETWORK DATA TRANSFERS WITH MINIMAL HOST PROCESSOR INVOLVEMENT

BACKGROUND OF THE INVENTION

1. Field of the Invention

The present invention relates to the field of computer network management. More specifically, the present invention relates to the management of data transfers between a host computer (or a peripheral device coupled to the host computer) and a network device. In one embodiment, the present invention relates to local area networks (LANs) using the Ethernet communication protocol (e.g., the IEEE 802.3 Standard) and systems using the IEEE 1394 serial communication bus standard.

2. Related Art

Networked communication systems ("networks") are very popular mechanisms for allowing multiple computers and peripheral systems to communicate with each other within larger computer systems. Local area networks (LANs) are one type of networked communication system and one type of LAN utilizes the Ethernet communication standard (IEEE 802.3). Computer systems can also communicate with coupled peripherals using different bus standards including the Peripheral Component Interconnect (PCI) bus standard and the Industry Standard Architecture (ISA) and Extended Industry Standard Architecture (EISA) bus standards. Recently, the IEEE 1394 serial communication standard has become a popular bus standard adopted by manufacturers of computer systems and peripheral components for its high speed and interconnection flexibilities. Moreover, network environments in which multiple communication protocols are utilized are becoming increasingly common. As such, efficient data transfer management in these network environments is essential to maximize the performance advantages that can be gained from the latest communication standards.

Despite the adoption of high performance bus standards and communication protocols, management of data transfers between different devices remains a resource intensive process. Stated differently, data transfer management tasks usually require much processing time of a processor which handles these tasks. The prior art typically implements data transfer management using the main processor in a host computer. For example, to transfer data from an internal disk drive to host memory, the host processor is responsible for reading the entire data block to be transferred from the disk drive and then writing the same block of data to host memory. While this prior art data transfer management method provides a mechanism for transferring data from one device to another, it consumes much resources of the host processor. In particular, the host processor has to actively manage the entire data transfer process and is frequently interrupted by read and write requests. These requests increase the time required to complete other computations because the host processor's availability to perform these computation is significantly reduced by the need to service the data transfer management requests. In other words, the high degree of involvement of the host processor in data transfer management adversely affects the performance of the host computer.

Moreover, due to the many communication standards available within computer systems and communication systems, it is often the case that one computer (or device) of one communication standard or "protocol" needs to communicate with another computer (or device) of another communication protocol. Unfortunately, data packet sizes are not necessarily compatible from one communication standard to another. For instance, the Ethernet communication standard supports a maximum packet size of 1.5 kilobytes (kB), while the IEEE 1394 communication standard ("1394") currently supports three different packet sizes 0.5 kB, 1.0 kB and 1.5 kB which correspond to three different physical data transfer speeds S100, S200 and S400. In the future, the 1394 protocol may support larger packet sizes up to 16 kB (16384 Bytes). However, since all 1394-compliant devices must support the basic physical speed of S100, all such devices must be able to communicate data in the basic packet size of 0.5 kB.

Device incompatibility with respect to packet size discrepancies among different communication protocols in network environments is more frequently encountered today due to recent industry trends to utilize new, high performance bus technology, such as the IEEE 1394 standard, in existing network environments which commonly utilize a different communication protocol, such as the Ethernet standard. In the prior art, data is typically transferred within a host computer between internal storage devices (e.g., disk drive) and memory (e.g., RAM) over an internal bus (e.g., a PCI bus). Since these internal data transfers involve a single communication standard (e.g., the PCI bus standard), the implementation of such internal transfers does not encounter packet size limitations. Thus, while the prior art provides a mechanism for internal data transfers, it does not address the issue of transferring data across different communication protocols with incompatible data packet sizes. As an example, using the prior art data transfer method, an Ethernet data packet larger than 0.5 kB cannot be transmitted over a 1394 bus operating at S100 speed and having a maximum packet size of 0.5 kB. In other words, these packet size limitations create incompatibility among different devices coupled to the same network. As such, the high speed and interconnection flexibilities of 1394 protocol cannot be fully utilized in a network which also has devices utilizing different communication protocols.

In addition to the incompatibility that arises from packet size discrepancies as described herein, it is appreciated that the data packet formats (e.g., data frame formats) between different communication standards are not necessarily compatible. A co-pending application entitled "A Method for Efficient Data Transfers Between Domains of Differing Data Formats" by Lo, et al. U.S. Ser. No. 09/085,135, assigned to the same assignee and filed concurrently with the instant application, is hereby incorporated by reference, and still pending.

Thus, there is a need for a data transfer management method which does not so heavily burden a host processor with managing data transfers as to adversely impact the performance of the host processor. A further need exists for a data transfer management method which is not constrained by data packet size within a network environment utilizing multiple communication protocols.

SUMMARY OF THE INVENTION

Accordingly, the present invention provides a novel method for managing data transfers which requires minimal host processor involvement and is capable of transmitting data packets of different sizes within a network environment. The present invention shifts the majority of the data transfer management tasks from a host processor to a processor within a network device. Thus, the host processor delivers better overall performance by dedicating more of its resources to computations unrelated to data transfer management. Further, by transmitting large data blocks in smaller packets iteratively as necessary to accommodate the packet size limitation of a communication protocol, the present invention eliminates the incompatibility within the network despite any discrepancies in packet sizes among different communication protocols. Therefore, the present invention enables the performance advantages of new communication protocols to be fully realized in existing network environments. These and other advantages of the present invention not specifically mentioned above will become clear within discussions of the present invention presented herein.

In one exemplary embodiment, data is transferred over a high performance serial bus utilizing the IEEE 1394 communication protocol and a network utilizing the Ethernet communication protocol. Specifically, a host computer is coupled to a network device via a 1394 bus. A peripheral device is also coupled to the host computer. The network device has an embedded processor and is coupled to an Ethernet network. To transfer data from the peripheral device to the network, the processor in the host computer generates a data pointer table and sends it to the network device over the 1394 bus. The data pointer table comprises memory address information which identifies the location of the data block destined for transfer in the peripheral device. At this point, data transfer management shifts to the embedded processor in the network device, relieving the host processor from the task. The embedded processor uses the information in the data pointer table to locate and transmit the designated block of data from the peripheral device to the network, thus completing the data transfer.

Moreover, embodiments of the present invention determine whether the packet sizes of the corresponding communication protocols are compatible. Specifically, in one embodiment, data received by the network device from the Ethernet network is to be transmitted to the peripheral device coupled to the host computer via the 1394 bus. When it is determined that the size of the Ethernet packet exceeds the maximum packet size supported by the 1394 bus, this embodiment of the present invention automatically divides the data block into multiple data packets, such that each packet conforms to the maximum packet size of the 1394 protocol which has the more restrictive limitation. The smaller packets are then transmitted over the 1394 bus iteratively. Likewise, in another embodiment, when it is determined that the size of a 1394 packet that is to be transmitted over a Ethernet-compliant bus exceeds the maximum packet size supported by the Ethernet protocol (e.g., maximum Ethernet packet size is 1.5 kB while maximum 1394 packet size is 16 kB), multiple Ethernet packets are used to complete the data transmission iteratively. As such, the present invention eliminates the incompatibility problem associated with differences in packet size among different communication protocols, which is an issue unaddressed by the prior art.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, a method for managing network data transfers with minimal host processor involvement, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Figure 1A:
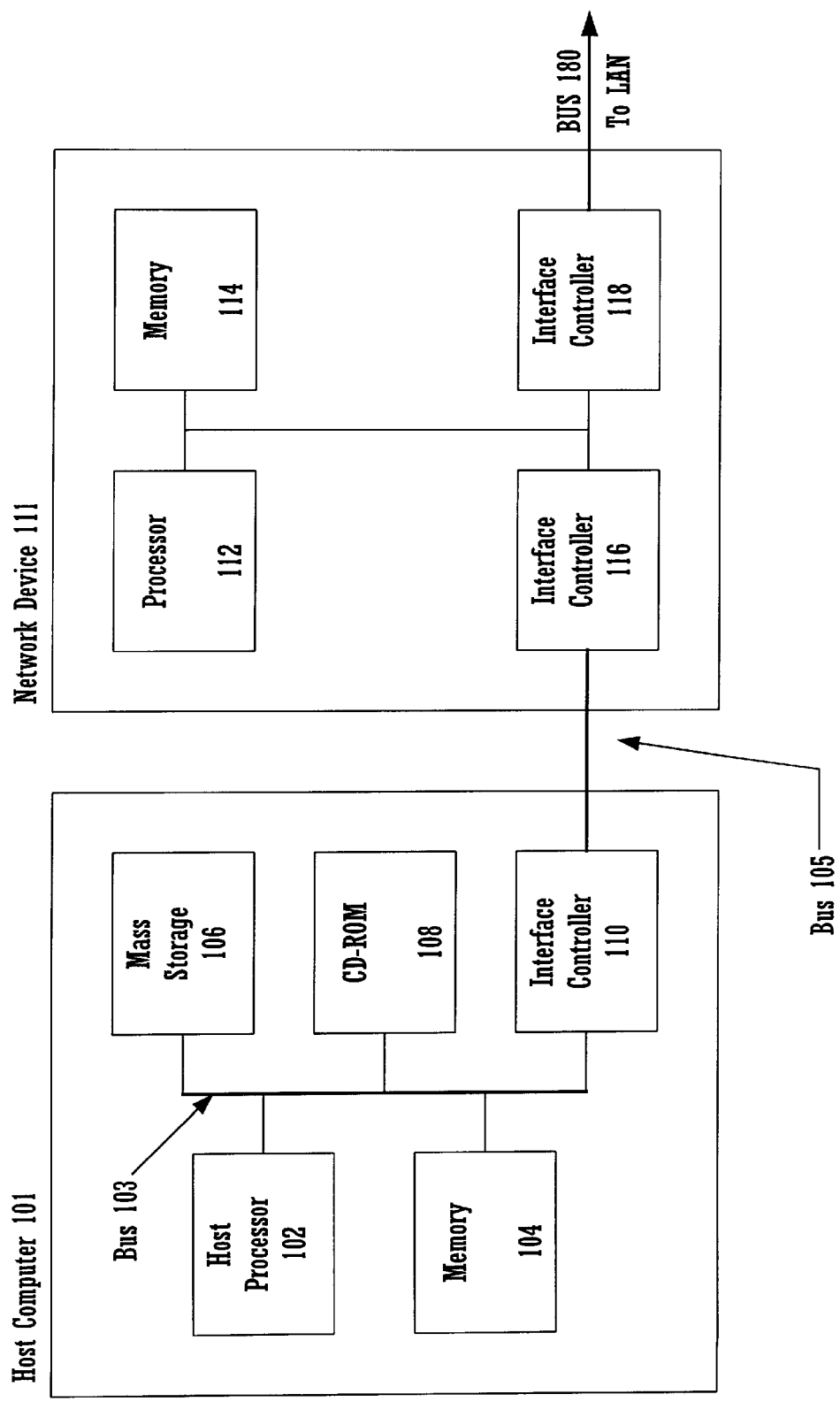
FIG. 1A illustrates an exemplary configuration of a host computer and a network device within a network environment in accordance with the present invention.

FIG. 1A illustrates an exemplary configuration of a host computer 101 and a network device 111 within a network environment in accordance with the present invention. In one embodiment, host computer 101 contains a host processor 102 (e.g., a micro-controller or microprocessor) coupled to a bus 103 (e.g., ISA, EISA, PCI, etc.). Additionally, a computer readable memory unit 104 is coupled to bus 103, where memory unit 104 can include read only memory (ROM) portions and/or random access memory (RAM) portions. Also coupled to bus 103 is a mass storage unit 106 which can be an optical or magnetic disk. A compact disk read only memory (CD-ROM) unit 108 can be optionally coupled to bus 103. Moreover, an interface controller 110 is coupled to bus 103. Interface controller 110 is also coupled to a bus 105 which is of a first communication protocol. To the other end of bus 105 is coupled an interface controller 116 within network device 111. Thus, interface controller 110 and interface controller 116 act as the conduits for data transfers between host computer 101 and network device 111 via bus 105.

Figure 1B:
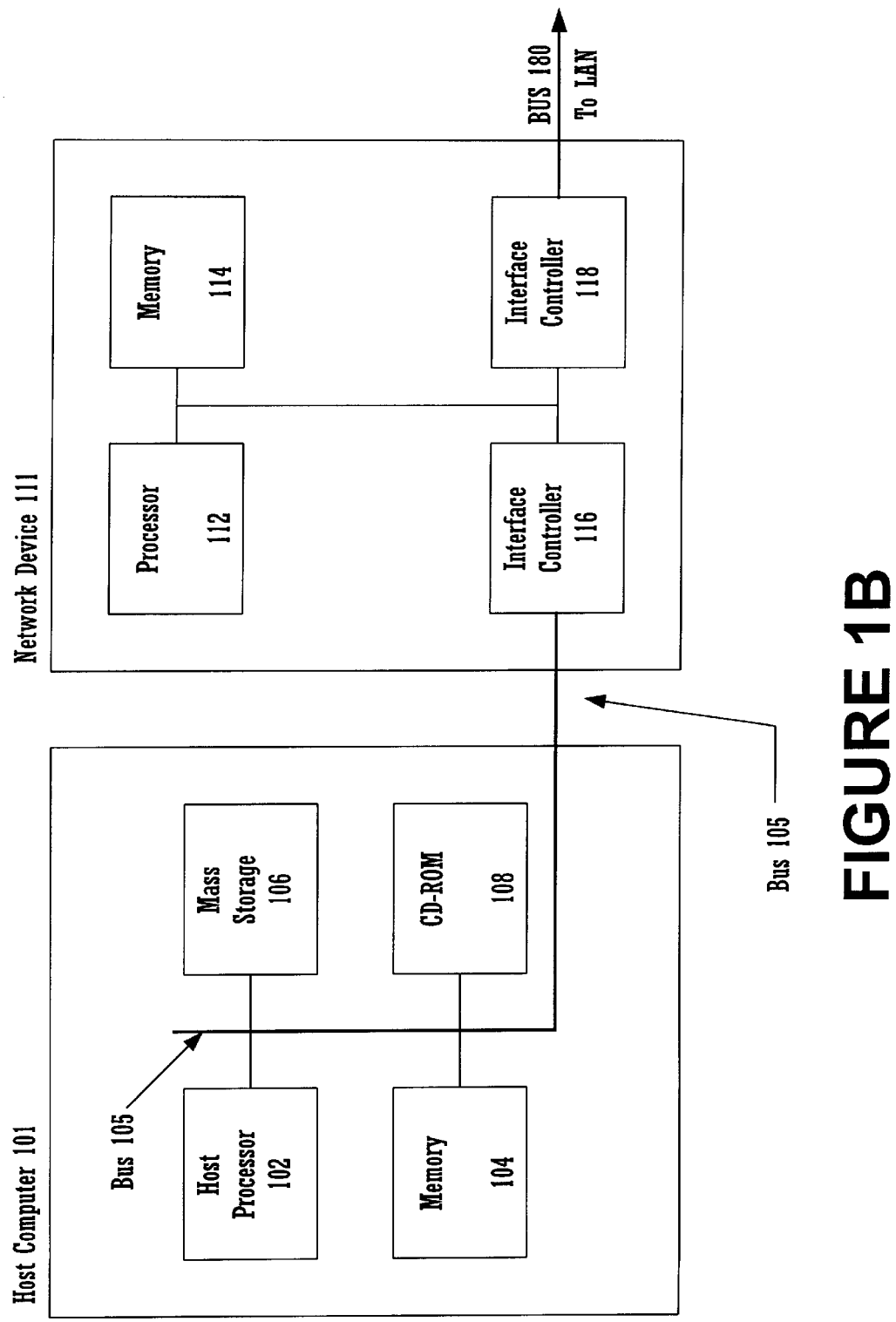
FIG. 1B illustrates another exemplary configuration of a host computer and a network device within a network environment in accordance with the present invention.

FIG. 1B illustrates another exemplary configuration of a host computer 101 and a network device 111 within a network environment in accordance with the present invention. In this embodiment, host computer 101 contains a host processor 102 (e.g., a micro-controller or microprocessor) coupled to a bus 105. Additionally, a computer readable memory unit 104 is coupled to bus 105, where memory unit 104 can include read only memory (ROM) portions and/or random access memory (RAM) portions. Also coupled to bus 105 is a mass storage unit 106 which can be an optical or magnetic disk. A compact disk read only memory (CD-ROM) unit 108 can be optionally coupled to bus 105. In other words, component units and peripheral devices of host computer 101, including host processor 102, memory unit 104, mass storage unit 106 and CD-ROM unit 108, are directly coupled to bus 105, which is in turn coupled to an interface controller 116 within network device 111. Thus, in this embodiment, host computer 101 does not require a dedicated interface controller, and interface controller 116 within network device 111 acts as the conduit for data transfers between host computer 101 and network device 111 via bus 105.

In these embodiments, still referring to FIGS. 1A and 1B, network device 111 contains a processor 112 (e.g., an embedded processor or micro-controller) coupled to a memory unit 114 that can include volatile (e.g., RAM) and non-volatile (e.g., ROM) portions. Importantly, processor 112 is capable of accessing data and executing instructions stored in memory unit 114. As described in detail below, this capability enables processor 112 to perform a majority of data transfer management tasks using information sent by host computer 101 over bus 105 and stored in memory unit 114.

In an exemplary embodiment, processor 112 in network device 111 is an ARM (Advanced RISC Machine) embedded processor. However, it is appreciated that other embedded processors or micro-controllers, such as those offered by Intel Corporation (e.g., I-960) and MIPS Technologies, Inc., can also be used for processor 112 in accordance with the present invention.

Additionally, as illustrated in FIGS. 1A and 1B, network device 111 contains two interface controllers 116 and 118. Interface controller 116 is coupled to bus 105 which is of the first communication protocol, while interface controller 118 is coupled to a computer network (e.g. LAN), which is of a second communication protocol, via bus 180.

Moreover, in an embodiment where the first communication protocol is compatible with the IEEE 1394 serial communication standard, each one of interface controllers 110 (when needed as illustrated in FIG. 1A) and 116 is a well known IEEE 1394 interface controller that contains well known physical and link layer circuits for providing communication of data packets to and from the IEEE 1394 serial communication bus 105. In another embodiment, where the second communication protocol is compatible with the IEEE 802.3 ("Ethernet") communication standard, interface controller 118 is a well known Ethernet interface controller that contains well known physical and link layer circuits for providing communication of data packets to and from the Ethernet communication bus 180. Specifically, in a preferred embodiment of the present invention, the first communication protocol is compatible with the IEEE 1394 serial communication standard and the second communication protocol is compatible with the IEEE 802.3 ("Ethernet") communication standard. In this embodiment, the method of the present invention overcomes the incompatibility presented by the packet size discrepancies of the two communication protocols and transfers data seamlessly across the different protocols, as will be discussed in more detail below.

Figure 1C:
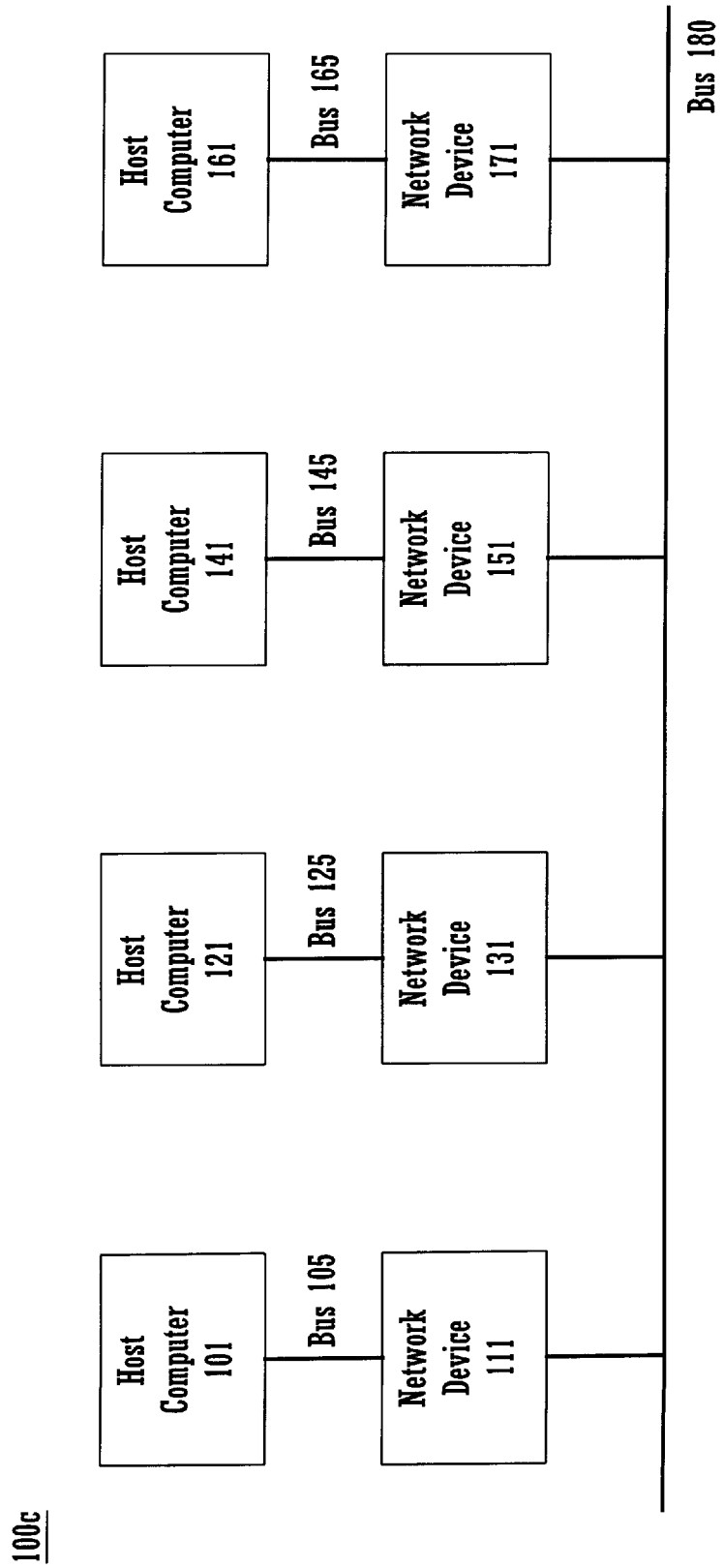
FIG. 1C illustrates an exemplary network environment in accordance with the present invention.

FIG. 1C illustrates an exemplary network environment 100C in accordance with the present invention. Network environment 100C (e.g., a LAN) includes host computer 101 and network device 111. Network device 111 is coupled to bus 180 of the network 100C and is also coupled to host computer 101 via bus 105, as described in detail with respect to FIGS. 1A and 1B above. Network environment 100C also includes additional host computers 121, 141 and 161 and additional network devices 131, 151 and 171. These additional host computers 121, 141 and 161 are coupled to their corresponding network devices 131, 151 and 171 via buses 125, 145 and 165, respectively, as illustrated in FIG. 1C. Network devices 131, 151 and 171 are in turn coupled to bus 180 of the network 100C. The details of implementing the data transfer method of the present invention are discussed below in terms of exemplary host computer 101 and network device 111 with reference to FIGS. 2 to 7. Yet, it is appreciated that each of host computers 101, 121, 141 and 161 is capable of sending and receiving information to and from network 100C.

Figure 1D:
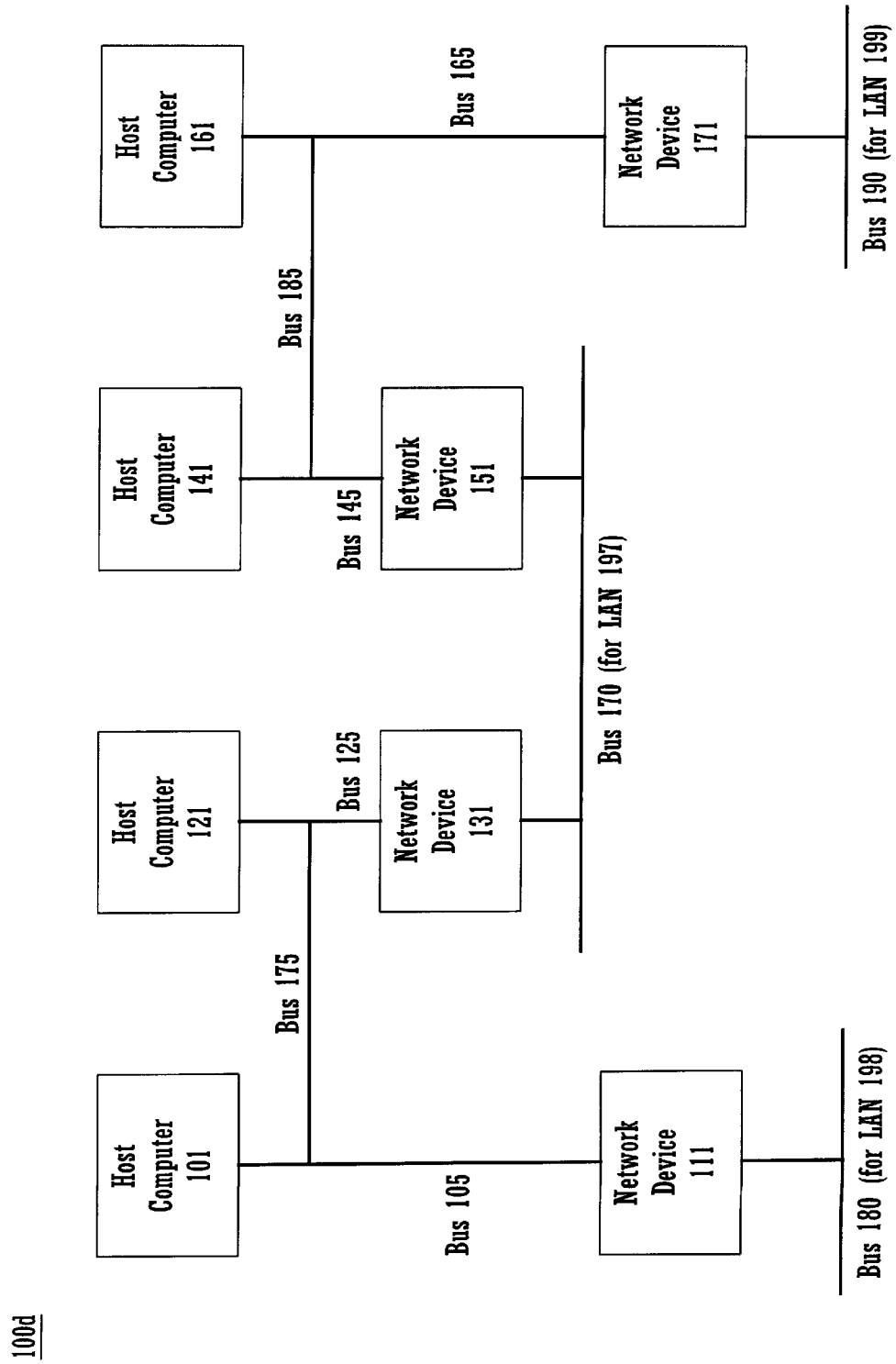
FIG. 1D illustrates another exemplary network environment in accordance with the present invention.

FIG. 1D illustrates another exemplary network environment 100D in accordance with the present invention. Network environment 100D comprises multiple networks (e.g., LAN's) coupled together by various buses and network devices. Specifically, network environment 100D includes host computer 101 and network device 111. Network device 111 is coupled to bus 180 of LAN 198 and is also coupled to host computer 101 via bus 105, as described in detail with respect to FIGS. 1A and 1B above. Network environment 100D also includes additional host computers 121, 141 and 161 and additional network devices 131, 151 and 171. These additional host computers 121, 141 and 161 are coupled to their corresponding network devices 131, 151 and 171 via buses 125, 145 and 165, respectively, as illustrated in FIG. 1D. Network devices 131 and 151 are coupled to bus 170 of LAN 197 while network device 171 is coupled to bus 190 of LAN 199. In addition, buses 105 and 125 are coupled to each other by bus 175, and buses 145 and 165 are coupled to each other by bus 185, as illustrated in FIG. 1D. The details of implementing the data transfer method of the present invention are discussed below in terms of exemplary host computer 101 and network device 111 with reference to FIGS. 2 to 7. Yet, it is appreciated that each of host computers 101, 121, 141 and 161 is capable of sending and receiving information within network environment 100D. More particularly, since network devices 111 and 131 are coupled to each other via buses 105, 175 and 125, and network devices 151 and 171 are coupled to each other via buses 145, 185 and 165, this embodiment of the present invention enables full communication among host computers 101, 121, 141 and 161 across LAN's 197, 198 and 199.

It is also noted that flow diagrams 200-700, which are illustrated in FIGS. 2 through 7 and are discussed in detail below, include processes and steps of the present data transfer method which, in certain embodiments, are carried out by processors 102 and 112 of FIGS. 1A and/or 1B under the control, of computer-readable and computer-executable instructions. These instructions reside, for example, in data storage features such as computer useable volatile and/or non-volatile memory units 104 and/or 114 of FIGS. 1A and 1B. The computer-readable and computer-executable instructions are used to implement, for example, the operations related to management of data transfers between host computer 101 and network device 111 in FIGS. 1A and 1B.

Figure 2:
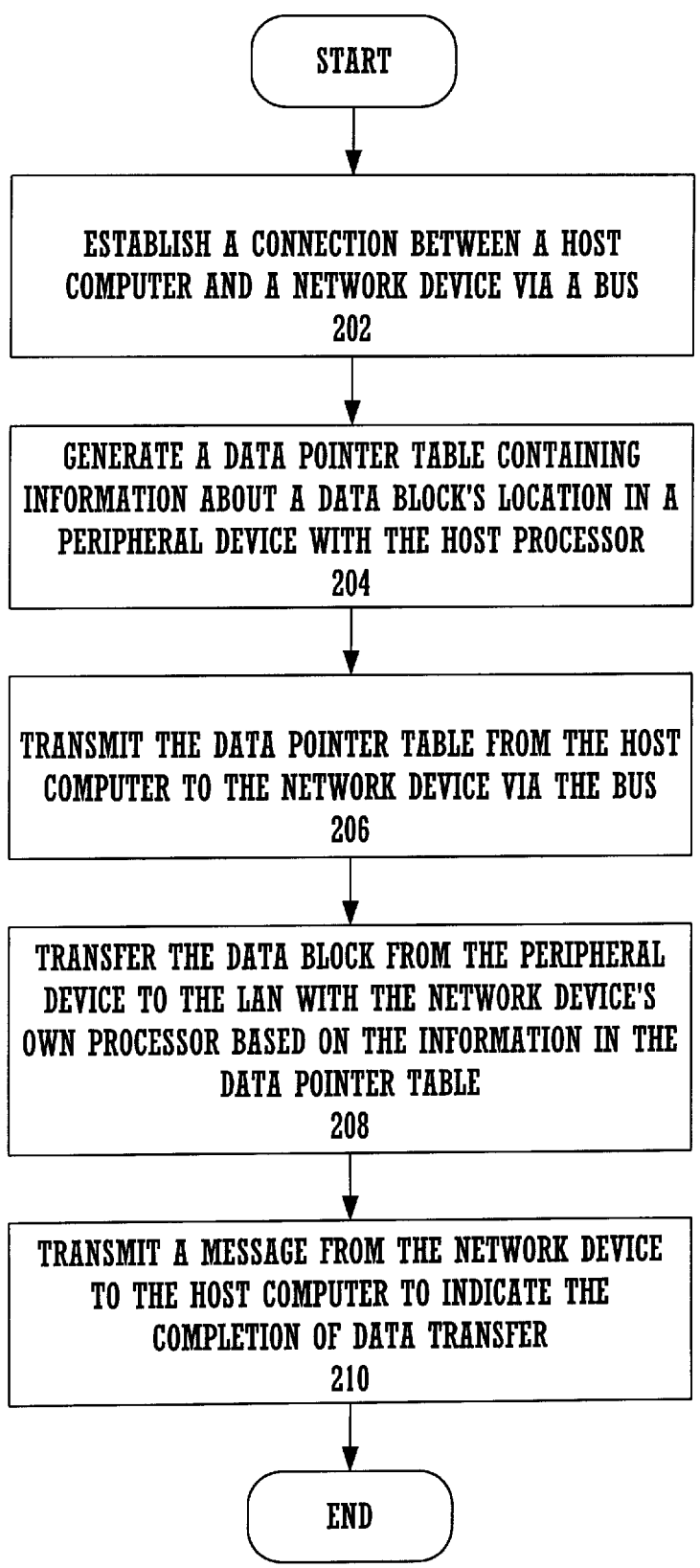
FIG. 2 is a flow diagram illustrating the process used by one embodiment of the present invention to transfer information from a peripheral device to a LAN.

With reference next to FIG. 2, a flow diagram 200 illustrating the process used by one embodiment of the present invention to transfer information from a peripheral device to a LAN is shown. Process 200 begins with step 202. In step 202, the present data transfer method establishes a connection between host computer 101 and network device 111 via bus 105. More particularly, the connection is established through interface controllers 110 (when needed as illustrated in FIG. 1A) and 116 in host computer 101 and network device 111, respectively. Thus, interface controller(s) 110 and/or 116 enable data communications and act as the conduits for data transfers between host computer 101 and network device 111 via bus 105.

Then, in step 204, host processor 102 of host computer 101 generates a data pointer table in memory unit 104 to initiate a data transfer process. The data pointer table includes memory address information identifying the location of a block of data that is stored in a peripheral device and is destined for transfer. In one embodiment, the data block to be transferred is stored in mass storage unit 106 and thus the data pointer table includes information specifying the corresponding memory location within mass storage unit 106.

In a preferred embodiment, the data pointer table is compatible with the Operation Request Block (ORB) format of the Serial Bus Protocol 2 (SBP-2). SBP-2 is a proposed American National Standard under development by T10, a Technical Committee of the National Committee for Information Technology Standardization (NCITS), under the project name 1155D. Implementation of the SBP-2 ORB format is well known in the art and is also discussed in detail in the latest draft of the proposed SBP-2 standard (Revision 2g, dated Sep. 15, 1997) as distributed by American National Standards Institute (ANSI), which is incorporated by reference herein. It is appreciated that although a preferred embodiment is described in terms of a data pointer table which is compatible with the SBP-2 ORB format, other data structures or data format can be used to implement the data pointer table in accordance with the present invention.

Next, in step 206, host processor 102 transmits the data pointer table generated in step 204 from memory unit 104 of host computer 101 to memory unit 114 of network device 111 via bus 105.

Importantly, since the data pointer table is very small in size, host processor 102 can efficiently transmit the entire data pointer table from host computer 101's memory unit 104 to network device 111's memory unit 114 while consuming minimal resources. No further processing is required of host processor 102 in order to complete the data transfer because the responsibility is shifted to processor 112 in network device 111. As such, host processor 102 can dedicate most of its resources to other computations and thus improve the overall performance of host computer 101.

Furthermore, once the transmission of the data pointer table is completed, processor 112 of network device 111 takes over the management of data transfer from host processor 102. Thus, in step 208, processor 112 proceeds to transfer the designated data block from mass storage unit 106 to the LAN. In particular, this transfer is made possible by the memory address information included in the data pointer table, which is now stored in memory unit 114 and is available for reference by processor 112. Using the memory address information, processor 112 is able to locate the data block as stored in mass storage unit 106 and perform the data transfer therefrom. In this step, interface controllers 110 (when needed as illustrated in FIG. 1A) and 116 enable data communications and act as the conduits for data transfers between host computer 101 and network device 111 via bus 105, while interface controller 118 enables data communications and acts as the conduit for data transfers between network device 111 and the LAN via bus 180.

In optional step 210, in one embodiment of the present data transfer method, processor 112 of network device 111 transmits a message to processor 102 of host computer 101 to indicate the successful completion of the data transfer process. Process 200 then terminates.

Figure 3:
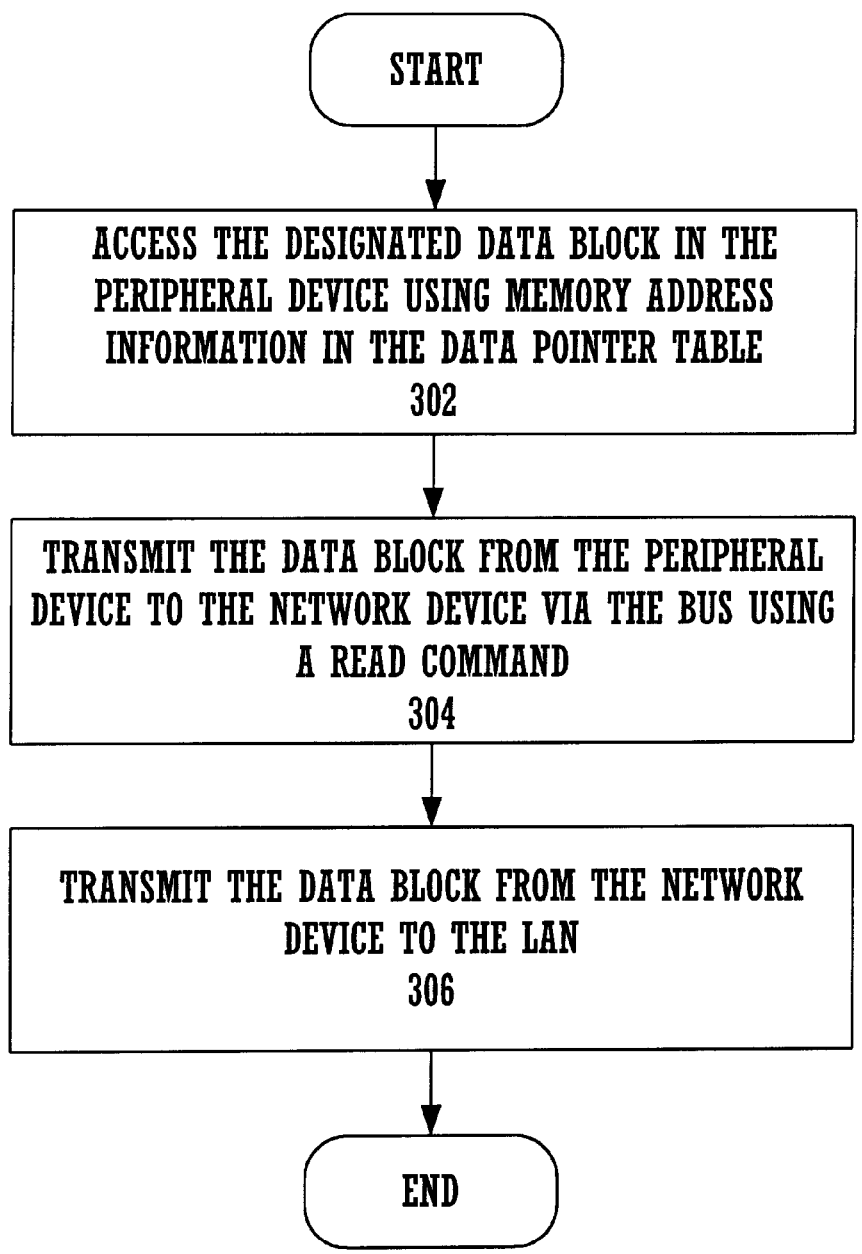
FIG. 3 is a flow diagram illustrating the steps used by another embodiment of the present invention to transfer a designated block of data from a peripheral device to a LAN.

Referring next to FIG. 3, a flow diagram 300 illustrating the steps used by one embodiment of the present invention to transfer a designated block of data from a peripheral device to a LAN is shown. Beginning with step 302, processor 112 of network device 111 accesses the designated data block in mass storage unit 106 by relying on the memory address information included in the data pointer table compiled (step 204) and sent over (step 206) by host processor 102.

Once the designated data block is located, then in step 304, processor 112 transmits the data block directly from mass storage unit 106 to memory unit 114 of network device 111 via bus 105 using a read command compatible with the communication protocol of bus 105. In a preferred embodiment, where bus 105 is compatible with the 1394 communication protocol, a 1394 bus read command is used to perform the data transmission.

It is appreciated that the data transfer method in accordance with the present invention is capable of performing a data transfer directly from a peripheral device coupled to host computer 101, such as mass storage unit 106, to memory unit 114 of network device 111 without any intermediate step. In particular, in accordance with the present invention, it is unnecessary to first transfer a data block from mass storage unit 106 to host memory 104 and then transfer the same data block from host memory 104 to memory unit 114 in network device 111, which in contrast is typically required by the prior art. By bypassing the host memory unit 104 in performing data transfer from mass storage unit 106 to network device 111, the present data transfer method advantageously minimizes the time and resources required by the process and also greatly improves the speed of the process.

Next, in step 306, processor 112 transmits the data block from memory unit 114 of network device 111 to the LAN via bus 180. In a preferred embodiment, the LAN and bus 180 are compatible with the Ethernet communication standard. When step 306 is completed, process 300 terminates.

Figure 4:
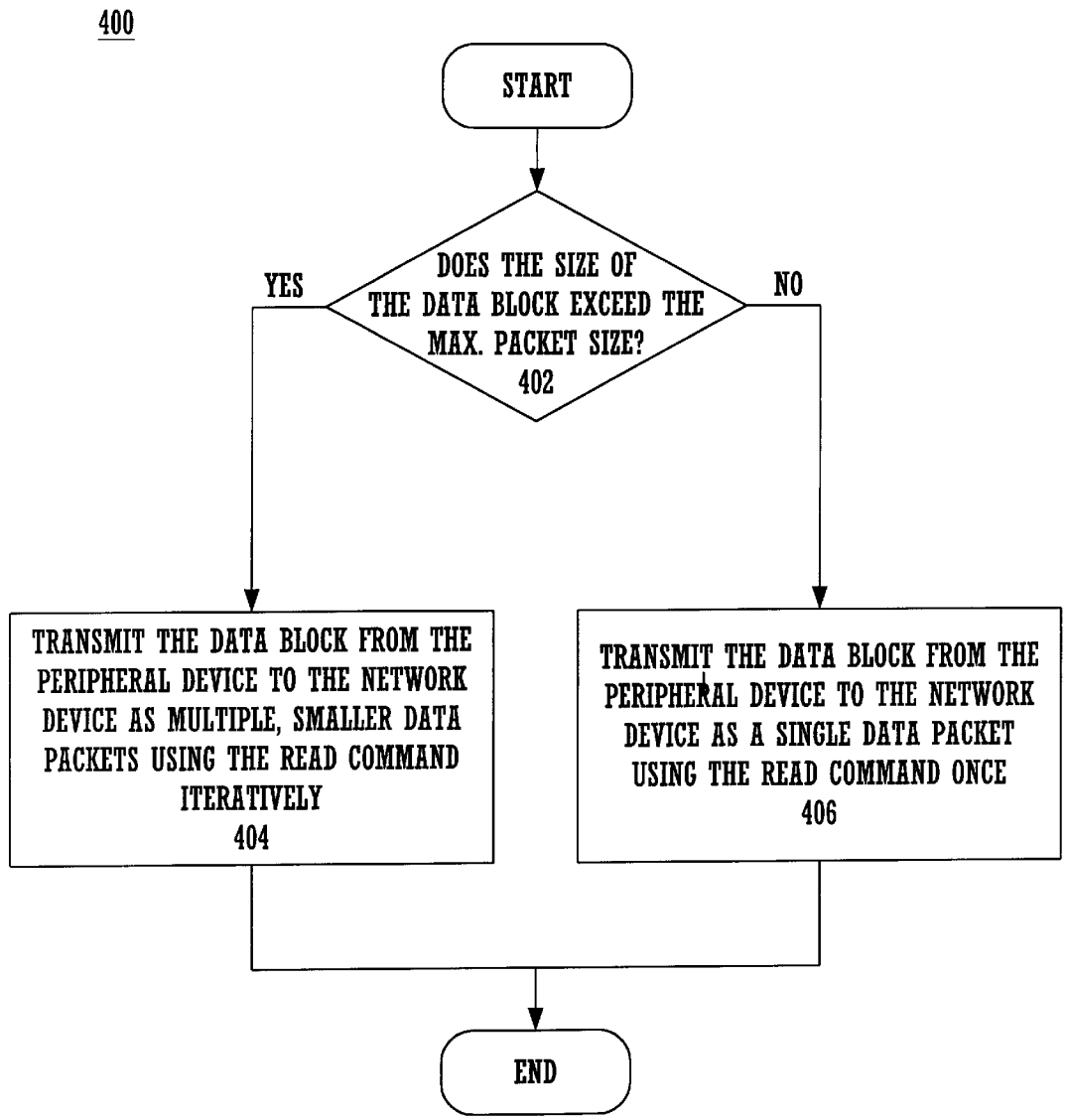
FIG. 4 is a flow diagram illustrating the steps used by one embodiment of the present invention to transmit a data block from a peripheral device to a network device.

Referring next to FIG. 4, a flow diagram 400 illustrating the steps used by one embodiment of the present invention to transmit a data block from a peripheral device to a network device is shown. Starting with step 402, in one embodiment, processor 112 in network device 111 determines whether the size of the data block, which is stored in a peripheral device such as mass storage unit 106 and is to be transmitted to network device 111, exceeds the maximum packet size supported by the communication protocol of bus 105. If it is determined that the size of the data block exceeds the maximum packet size supported by the communication protocol of bus 105, process 400 proceeds to step 404.

It is appreciated that in other embodiments, interface controller 110 and/or interface controller 116 are capable of determining whether the size of the data block to be transmitted exceeds the maximum packet size supported by the communication protocol of bus 105. In these embodiments, in step 402, interface controller(s) 110 and/or 116 are responsible for making the determination with respect to packet size limitations.

In step 404, processor 112 transmits portions of the data block as multiple, individual data packets from mass storage unit 106 to network device 111 over bus 105, where each individual data packet is in conformity with the maximum packet size of the communication protocol of bus 105. Particularly, processor 112 uses a read command compatible with the communication protocol of bus 105 iteratively to transmit the individual data packets until the entire data block is transmitted. Process 400 then terminates.

On the other hand, still referring to FIG. 4, if it is determined in step 402 that the size of the data block does not exceed the maximum packet size supported by the communication protocol of bus 105, process 400 proceeds to step 406. In step 406, processor 112 simply transmits the entire data block as a single data packet by using a read command compatible with the communication protocol of bus 105 once. Process 400 then terminates.

Thus, by transmitting the data block in multiple, individual packets when such a step is necessary to comply with the maximum packet size of the communication protocol of bus 105, the present data transfer method overcomes the incompatibility problem that can arise in network environments due to different packet size limitations of various communication protocols used.

Figure 5:
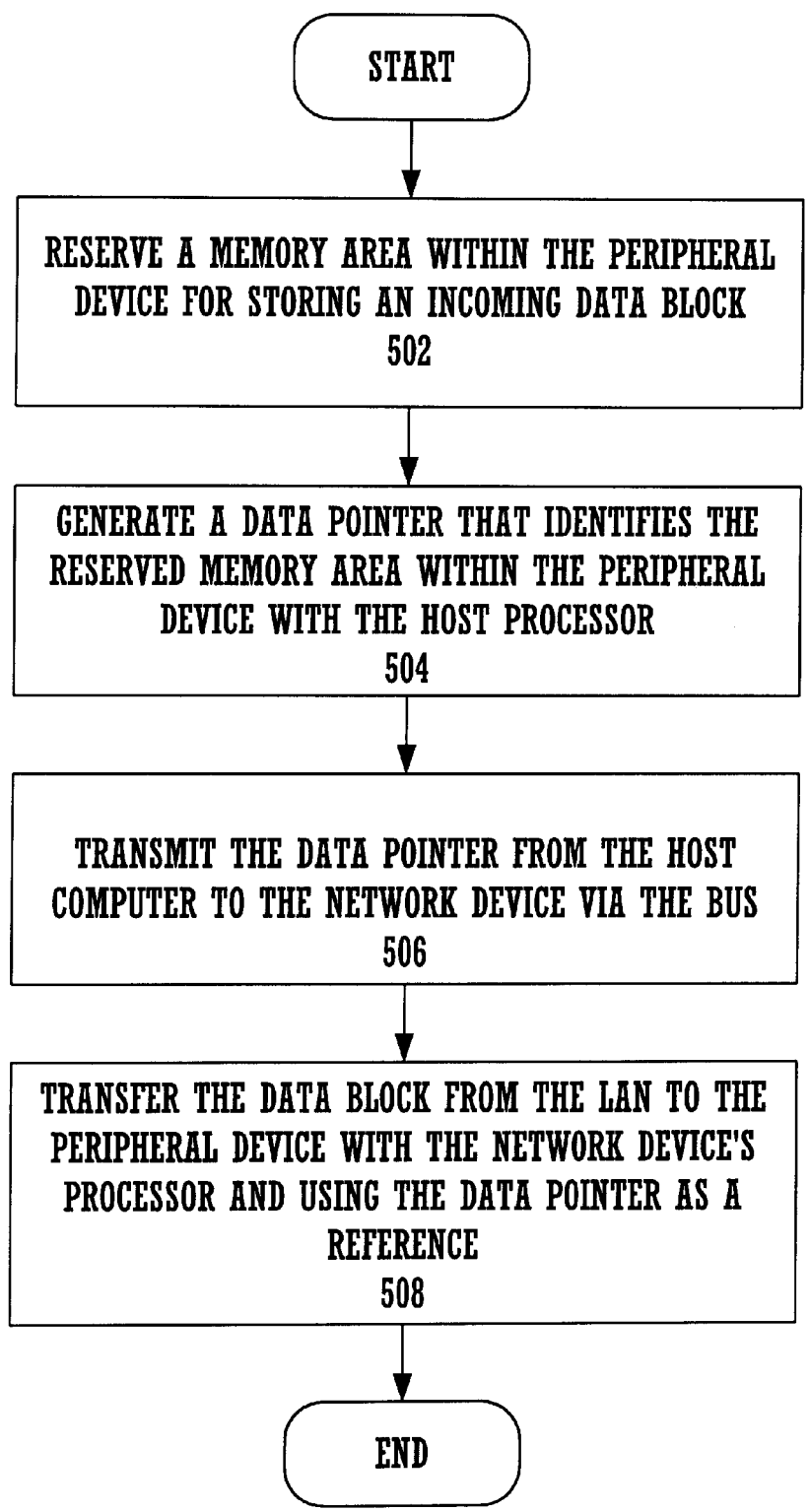
FIG. 5 is a flow diagram illustrating the process used by one embodiment of the present invention to transfer information from a LAN to a peripheral device.

With reference next to FIG. 5, a flow diagram 500 illustrating the process used by one embodiment of the present invention to transfer information from a LAN to a peripheral device is shown. Process 500 begins with step 502. In step 502, host processor 102 reserves a memory area within a peripheral device, such as mass storage unit 106, for storing an incoming data block from the LAN.

Then, in step 504, host processor 102 generates a data pointer that identifies the memory area in mass storage unit 106 reserved for the incoming data block in step 502.

Next, in step 506, host processor 102 transmits the data pointer generated in step 504 from memory unit 104 to memory unit 114 of network device 111 via bus 105.

Importantly, since the data pointer is very small in size, host processor 102 can efficiently transmit the data pointer from host computer 101's memory unit 104 to network device 111's memory unit 114 while consuming minimal resources. No further processing is required of host processor 102 in order to complete the data transfer because the responsibility is shifted to processor 112 in network device 111. As such, host processor 102 can dedicate most of its resources to other computations and thus improve the overall performance of host computer 101.

Furthermore, once the transmission of the data pointer is completed, processor 112 of network device 111 takes over the management of data transfer from host processor 102. Thus, in step 508, processor 112 proceeds to transfer the designated data block from the LAN to mass storage unit 106. In particular, this transfer is made possible by the data pointer, which is now stored in memory unit 114 and is available for reference by processor 112. Using the data pointer, processor 112 is able to locate the reserved memory area in mass storage unit 106 and perform the data transfer thereto. In this step, interface controller 118 enables data communications and acts as the conduit for data transfers between the LAN and network device 111 via bus 180, while interface controllers 116 and 110 (when needed as illustrated in FIG. 1A) enable data communications and act as the conduits for data transfers between network device 111 and host computer 101 via bus 105. Upon completion of step 508, process 500 terminates.

Figure 6:
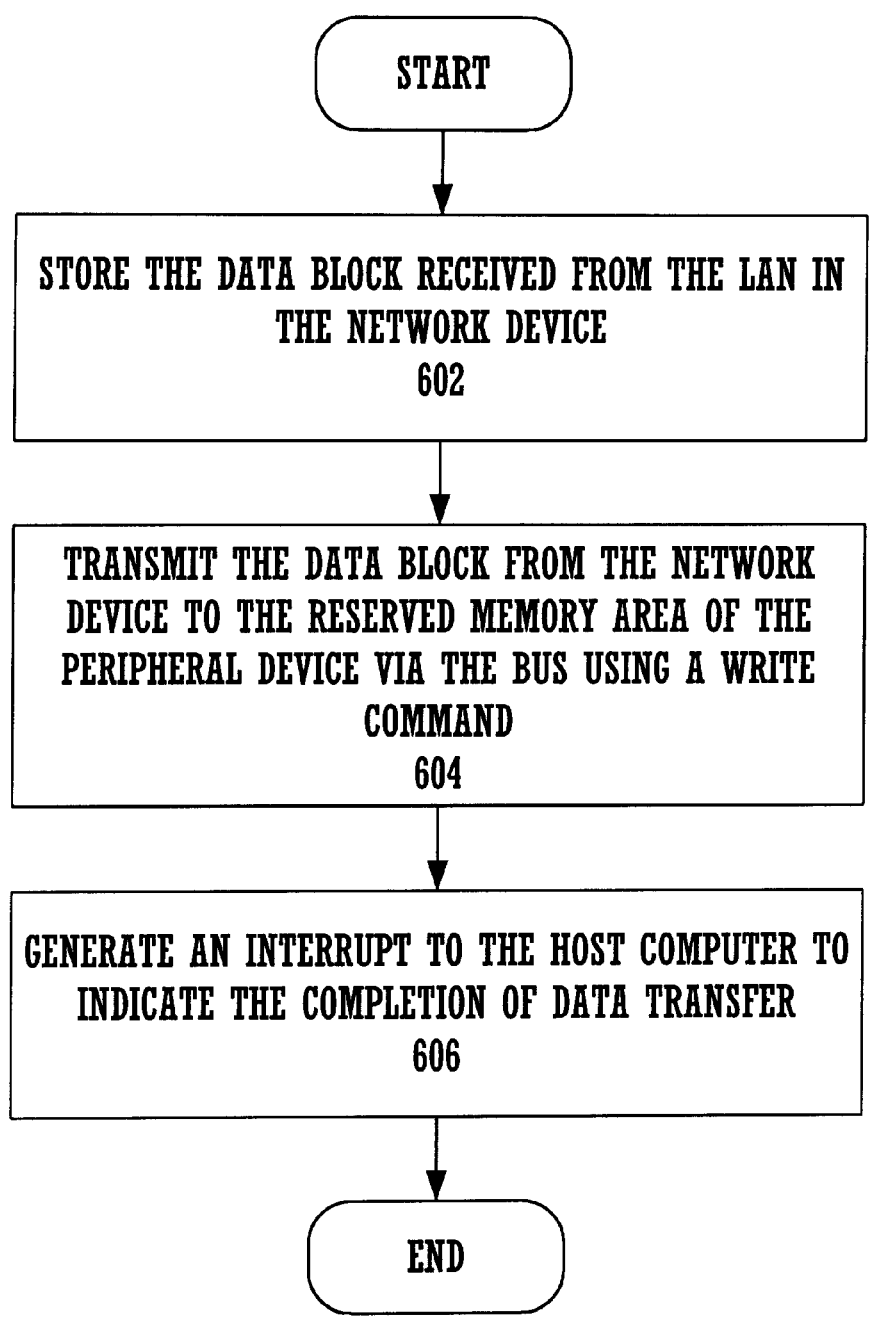
FIG. 6 is a flow diagram illustrating the steps used by another embodiment of the present invention to transfer a data block from a LAN to a peripheral device.

Referring next to FIG. 6, a flow diagram 600 illustrating the steps used by one embodiment of the present invention to transfer a block of data from a LAN to a peripheral device is shown. Beginning with step 602, processor 112 stores the data block received from the LAN in memory unit 114 of network device 111.

Then, in step 604, processor 112 transmits the data block directly from memory unit 114 of network device 111 to the reserved memory area in mass storage unit 106 via bus 105 using a write command compatible with the communication protocol of bus 105. In a preferred embodiment, where bus 105 is compatible with the 1394 communication protocol, a 1394 bus write command is used to perform the data transmission.

It is appreciated that the data transfer method in accordance with the present invention is capable of performing a data transfer directly from memory unit 114 of network device 111 to a peripheral device coupled to host computer 101, such as mass storage unit 106, without any intermediate step. In particular, in accordance with the present invention, it is unnecessary to first transfer a data block from memory unit 114 in network device 111 to host memory 104 and then transfer the same data block from host memory 104 to mass storage unit 106, which in contrast is typically required by the prior art. By bypassing the host memory unit 104 in performing data transfer from network device 111 to mass storage unit 106, the present data transfer method advantageously minimizes the time and resources required by the process and also greatly improves the speed of the process.

Next, in step 606, processor 112 of network device 111 generates an interrupt to processor 102 of host computer 101 to indicate the successful completion of the data transfer process. Process 600 then terminates.

Figure 7:
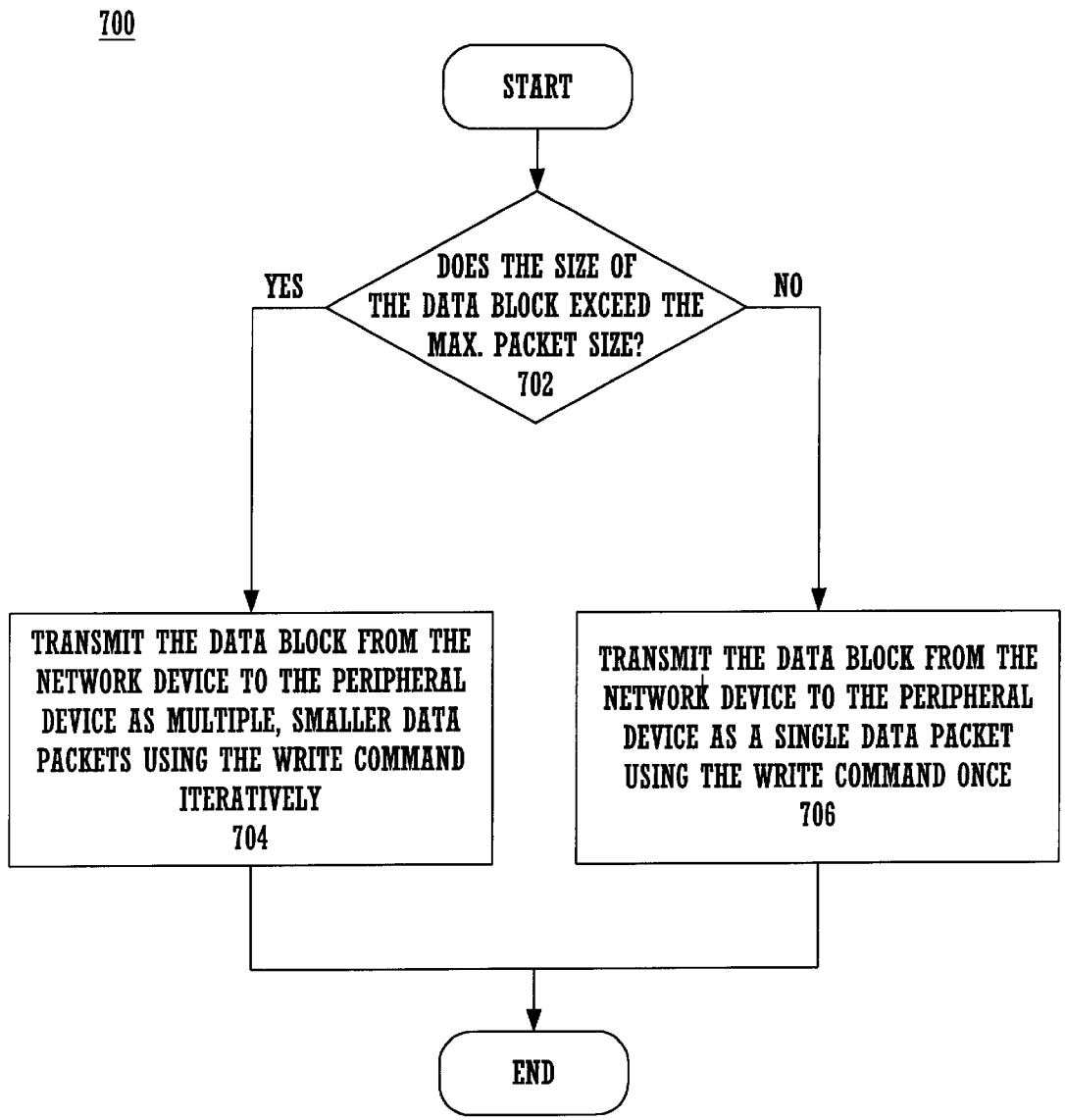
FIG. 7 is a flow diagram illustrating the steps used by one embodiment of the present invention to transmit a data block from a network device to a peripheral device.

Referring next to FIG. 7, a flow diagram 700 illustrating the steps used by one embodiment of the present invention to transmit a data block from a network device to a peripheral device is shown. Starting with step 702, in one embodiment, processor 112 in network device 111 determines whether the size of the data block, which is stored in memory unit 114 of network device 111 and is to be transmitted to the reserved memory area in mass storage unit 106, exceeds the maximum packet size supported by the communication protocol of bus 105. If it is determined that the size of the data block exceeds the maximum packet size supported by the communication protocol of bus 105, process 700 proceeds to step 704.

It is appreciated that in other embodiments, interface controller 116 and/or interface controller 110 are capable of determining whether the size of the data block to be transmitted exceeds the maximum packet size supported by the communication protocol of bus 105. In these embodiments, in step 702, interface controller(s) 116 and/or 110 are responsible for making the determination with respect to packet size limitations.

In step 704, processor 112 transmits portions of the data block as multiple, individual data packets from network device 111 to the reserved memory area in mass storage unit 106 over bus 105, where each individual data packet is in conformity with the maximum packet size of the communication protocol of bus 105. Particularly, processor 112 uses a write command compatible with the communication protocol of bus 105 iteratively to transmit the individual data packets until the entire data block is transmitted. Process 700 then terminates.

On the other hand, still referring to FIG. 7, if it is determined in step 702 that the size of the data block does not exceed the maximum packet size supported by the communication protocol of bus 105, process 700 proceeds to step 706. In step 706, processor 112 simply transmits the entire data block as a single data packet by using a write command compatible with the communication protocol of bus 105 once. Process 700 then terminates.

Thus, once again, by transmitting the data block in multiple, individual packets when such a step is necessary to comply with the maximum packet size of the communication protocol of bus 105, the present data transfer method overcomes the incompatibility problem that can arise in network environments due to different packet size limitations of various communication protocols used.

It is appreciated that host computer 101 is capable of originating data packets and also of receiving data packets. In other words, data flow can take place in both direction s over bus 105 in accordance with the present invention. Moreover, although particular embodiments described above have a bus 105 which is compatible with the IEEE 1394 serial communication standard, it is appreciated that any high performance bus standard or other communication standards, such as ATM (Asynchronous Transfer Mode), FDDI (Fiber Distributed Data Interface) an d Gigabit Ethernet, can also be used as the first communication protocol in accordance with the present invention. Likewise, although particular embodiments described above have a second communication protocol which is compatible with the Ethernet communication standard, it is appreciated that any other bus standard or communication standard as described above can also be used as the second communication protocol in accordance with the present invention. Thus, the novel method of the present invention can be used to implement data transfer between different types of networks, different types of buses or different types of protocols.

Furthermore, although the present invention has been described above in terms of particular embodiments which illustrate data transfers to and from an internal storage device (e.g., mass storage unit 106) of host computer 101, it is appreciated that other types of peripheral or storage devices not expressly enumerated can also be used in accordance with the present invention. Further, the novel method of the present invention also applies with respect to data transfers between "remote" devices and network device 111, where such remote devices are peripheral or storage devices within additional computers coupled to the same bus 105 to which host computer 101 is coupled.

The preferred embodiment of the present invention, a method for managing network data with minimal host processor involvement, is thus described. While the present invention has been described in particular embodiments, it should be appreciated that the present invention should not be construed as limited by such embodiments, but rather construed according to the below claims.

What is claimed is:

1. In a computer network, a method for transferring information, said method comprising the computer implemented steps of:

a) establishing a connection between a host computer and a network device via a first bus of a first communication protocol, wherein said network device is coupled to said computer network of a second communication protocol;

b) generating a data pointer table with a first processor of said host computer, said data pointer table comprising memory address information identifying a first data block residing in a peripheral device coupled to said host computer;

c) transmitting said data pointer table from said host computer to said network device via said first bus; and d) transferring said first data block from said peripheral device to said computer network with a second processor of said network device, wherein said transfer is accomplished by using said memory address information in said data pointer table as a reference.

2. The method as recited in claim 1 further comprising the step of:

e) transmitting a message from said network device to said host computer for indicating successful completion of said step d).

3. The method as recited in claim 1 wherein said step d) comprises the steps of:

d1) accessing said first data block in said peripheral device using said memory address information in said data pointer table as a reference;

d2) transmitting said first data block from said peripheral device to said network device via said first bus using a read command of said first communication protocol; and d3) transmitting said first data block from said network device to said computer network of said second communication protocol;
   wherein said steps d1), d2) and d3) are performed by said second processor of said network device.

4. The method as recited in claim 3 wherein said step d) further comprises the step of:

d4) performing computation unrelated to data transfer management with said first processor while said second processor is performing said steps d1), d2) and d3).

5. The method as recited in claim 3 wherein said step d2) comprises the steps of:

determining whether said first data block is larger than a maximum packet size of said first communication protocol;

transmitting said first data block from said peripheral device to said network device as a plurality of data packets using said read command iteratively, each of said plurality of data packets having a size compatible with said first communication protocol, if said first data block is larger than said maximum packet size of said first communication protocol; and transmitting said first data block from said peripheral device to said network device as a single data packet using said read command once if said first data block is not larger than said maximum packet size of said first communication protocol.

6. The method as recited in claim 1 further comprising the steps of:

f) reserving a memory area in said peripheral device for storing a second data block;

g) generating a data pointer with said first processor of said host computer, said data pointer identifying said reserved memory area;

h) transmitting said data pointer from said host computer to said network device via said first bus; and i) transferring said second data block from said computer network to said reserved memory area in said peripheral device with a second processor of said network device, using said data pointer as a reference.

7. The method as recited in claim 6 wherein said step i) comprises the steps of:

i1) storing said second data block, received from said computer network of said second communication protocol, in said network device;

i2) transmitting said second data block from said network device to said reserved memory area of said peripheral device via said first bus using a write command of said first communication protocol; and i3) generating an interrupt to said host computer for indicating successful completion of said step i2);

wherein said steps i1), i2) and i3) are performed by said second processor of said network device.

8. The method as recited in claim 7 wherein said step i2) comprises the steps of:
determining whether said second data block is larger than a maximum packet size of said first communication protocol;
transmitting said second data block from said network device to said peripheral device as a plurality of data packets using said write command iteratively, each of said plurality of data packets having a packet size compatible with said first communication protocol, if said second data block is larger than said maximum packet size of said first communication protocol; and
transmitting said second data block from said network device to said peripheral device as a single data packet using said write command once if said second data block is not larger than said maximum packet size of said first communication protocol.

9. The method as recited in claim 1 wherein said first communication protocol is compatible with the IEEE 1394 communication standard.

10. The method as recited in claim 1 wherein said first communication protocol is compatible with the Ethernet IEEE 802.3 communication standard.

11. The method as recited in claim 1 wherein said first communication protocol is different from said second communication protocol.

12. The method as recited in claim 1 wherein said data pointer table is compatible with the Operation Request Block (ORB) format of the Serial Bus Protocol 2 (SBP-2).

13. The method as recited in claim 1 wherein said host computer comprises a first interface controller coupled to said first bus for communicating with said network device via said first bus.

14. The method as recited in claim 1 wherein said network device comprises:
a second interface controller coupled to said first bus for communicating with said host computer via said first bus; and
a third interface controller coupled to said second interface controller and to a second bus for communicating with said computer network via said second bus.

15. A network device coupled between a host computer and a computer network, wherein said host computer comprises a first processor and said network device comprises a second processor coupled to a memory unit, said memory unit containing instructions that when executed implement a method for transferring information, said method comprising the computer implemented steps of:
a) establishing a connection between said host computer and said network device via a first bus of a first communication protocol, wherein said computer network is of a second communication protocol;
b) generating a data pointer table with said first processor of said host computer, said data pointer table comprising memory address information identifying a first data block residing in a peripheral device coupled to said host computer;
c) transmitting said data pointer table from said host computer to said network device via said first bus; and
d) transferring said first data block from said peripheral device to said computer network with said second processor of said network device, wherein said transfer is accomplished by using said memory address information in said data pointer table as a reference.

16. The network device as recited in claim 15 wherein said method further comprises the step of:
e) transmitting a message from said network device to said host computer for indicating successful completion of said step d).

17. The network device as recited in claim 15 wherein said step d) of said method comprises the steps of:
d1) accessing said first data block in said peripheral device using said memory address information in said data pointer table as a reference;
d2) transmitting said first data block from said peripheral device to said network device via said first bus using a read command of said first communication protocol; and
d3) transmitting said first data block from said network device to said computer network of said second communication protocol;
wherein said steps d1), d2) and d3) are performed by said second processor of said network device.

18. The network device as recited in claim 17 wherein said step d) of said method further comprises the step of:
d4) performing computation unrelated to data transfer management with said first processor while said second processor is performing said steps D1), D2) and D3).

19. The network device as recited in claim 17 wherein said step D2) of said method comprises the steps of:
determining whether said first data block is larger than a maximum packet size of said first communication protocol;
provided that said first data block is larger than said maximum packet size of said first communication protocol, transmitting said first data block from said peripheral device to said network device as a plurality of data packets using said read command iteratively, each of said plurality of data packets having a size compatible with said first communication protocol; and
provided that said first data block is not larger than said maximum packet size of said first communication protocol, transmitting said first data block from said peripheral device to said network device as a single data packet using said read command once.

20. The network device as recited in claim 15 wherein said method further comprises the steps of:
f) reserving a memory area in said peripheral device for storing a second data block;
g) generating a data pointer with said first processor of said host computer, said data pointer identifying said reserved memory area;
h) transmitting said data pointer from said host computer to said network device via said first bus; and
i) transferring said second data block from said computer network to said reserved memory area in said peripheral device with a second processor of said network device, using said data pointer as a reference.

21. The network device as recited in claim 20 wherein said step i) of said method comprises the steps of:
i1) storing said second data block, received from said computer network of said second communication protocol, in said network device;
i2) transmitting said second data block from said network device to said reserved memory area of said peripheral device via said first bus using a write command of said first communication protocol; and
i3) generating an interrupt to said host computer for indicating successful completion of said step i2);

wherein said steps i1), i2) and i3) are performed by said second processor of said network device.

22. The network device as recited in claim 21 wherein said step i2) of said method comprises the steps of:
   determining whether said second data block is larger than a maximum packet size of said first communication protocol;
   provided that said second data block is larger than said maximum packet size of said first communication protocol, transmitting said second data block from said network device to said peripheral device as a plurality of data packets using said write command iteratively, each of said plurality of data packets having a packet size compatible with said first communication protocol; and
   provided that said second data block is not larger than said maximum packet size of said first communication protocol, transmitting said second data block from said network device to said peripheral device as a single data packet using said write command once.

23. The network device as recited in claim 15 wherein said first communication protocol is compatible with the IEEE 1394 communication standard.

24. The network device as recited in claim 15 wherein said first communication protocol is compatible with the Ethernet IEEE 802.3 communication standard.

25. The network device as recited in claim 15 wherein said first communication protocol is different from said second communication protocol.

26. The network device as recited in claim 15 wherein said data pointer table is compatible with the Operation Request Block (ORB) format of the Serial Bus Protocol 2 (SBP-2).

27. The network device as recited in claim 15 said host computer comprises a first interface controller coupled to said first bus for communicating with said network device via said first bus.

28. The network device as recited in claim 15 wherein said network device comprises:
   a second interface controller coupled to said first bus for communicating with said host computer via said first bus; and
   a third interface controller coupled to said second interface controller and to a second bus for communicating with said computer network via said second bus.

* * * * *